United States Patent [19]

Beigi et al.

[11] Patent Number: 5,787,197
[45] Date of Patent: Jul. 28, 1998

[54] POST-PROCESSING ERROR CORRECTION SCHEME USING A DICTIONARY FOR ON-LINE HANDWRITING RECOGNITION

[75] Inventors: Homayoon Sadr Mohammad Beigi, Mineola; Tetsunosuke Fujisaki, Armonk, both of N.Y.; William David Modlin, Boca Raton, Fla.; Kenneth Steven Wenstrup, Blue Ash, Ohio

[73] Assignee: International Business Machines Corporation, Armonk, N.Y.

[21] Appl. No.: 218,996

[22] Filed: Mar. 28, 1994

Related U.S. Application Data

[63] Continuation-in-part of Ser. No. 865,550, Apr. 9, 1992, abandoned.

[51] Int. Cl.⁶ ............................................. G06K 9/00
[52] U.S. Cl. .................. 382/187; 382/310; 382/229
[58] Field of Search .................. 382/186–189, 382/309–311, 224–231; 178/18–19; 345/173, 179

[56] References Cited

U.S. PATENT DOCUMENTS

| | | |
|---|---|---|
| 3,969,700 | 7/1976 | Bollinger et al. ............... 382/231 |
| 4,653,107 | 3/1987 | Shojima et al. ................. 382/13 |
| 4,975,974 | 12/1990 | Nishijima et al. ............. 382/221 |
| 4,979,227 | 12/1990 | Mittelbach et al. ........... 382/231 |
| 5,010,579 | 4/1991 | Yoshida et al. ................ 382/13 |
| 5,020,117 | 5/1991 | Ooi et al. ...................... 382/46 |
| 5,029,223 | 7/1991 | Fujisaki ......................... 382/187 |
| 5,034,991 | 7/1991 | Hagimae et al. .............. 382/30 |
| 5,151,950 | 9/1992 | Hullender ..................... 382/187 |

*Primary Examiner*—Leo H. Boudreau
*Assistant Examiner*—Bhavesh Mehta
*Attorney, Agent, or Firm*—Robert P. Tassinari, Jr.

[57] ABSTRACT

A dictionary based post-processing technique for an on-line handwriting recognition system is described. An input word has all punctuation removed, and the word is checked against a word processing dictionary. If any word matches against the dictionary, it is verified as a valid word. If it does not verify, a stroke match function and a spell-aid dictionary are used to construct a list of possible words. In some cases, the list is appended with possible words based on changing the first character of the originally recognized word. A character-match score, a substitution score and a word length are assigned to the items on the list. A word hypothesis is constructed from the list with each such word being assigned a score. The word with the best score is chosen as the output word for the processor.

1 Claim, 11 Drawing Sheets

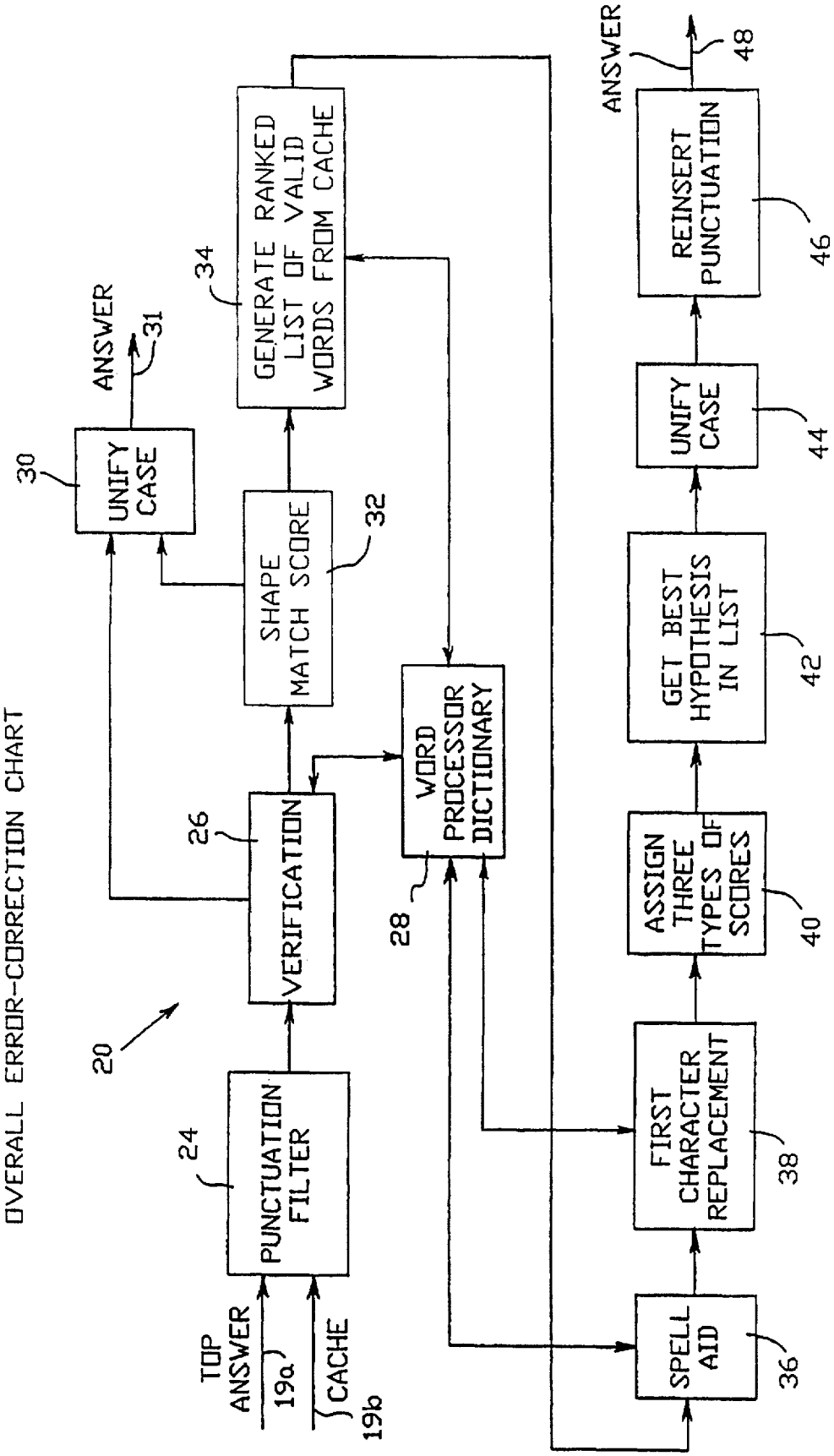

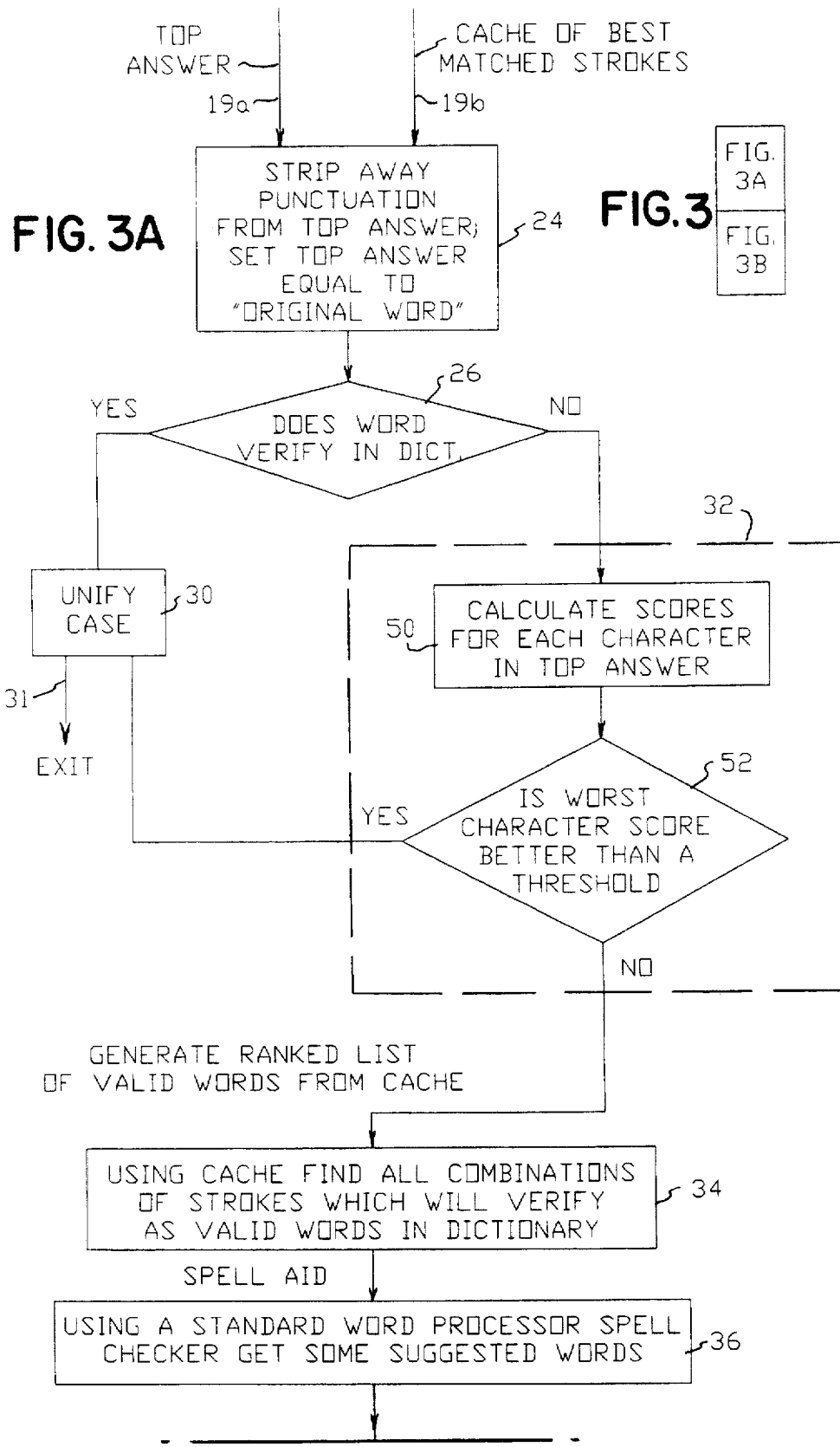

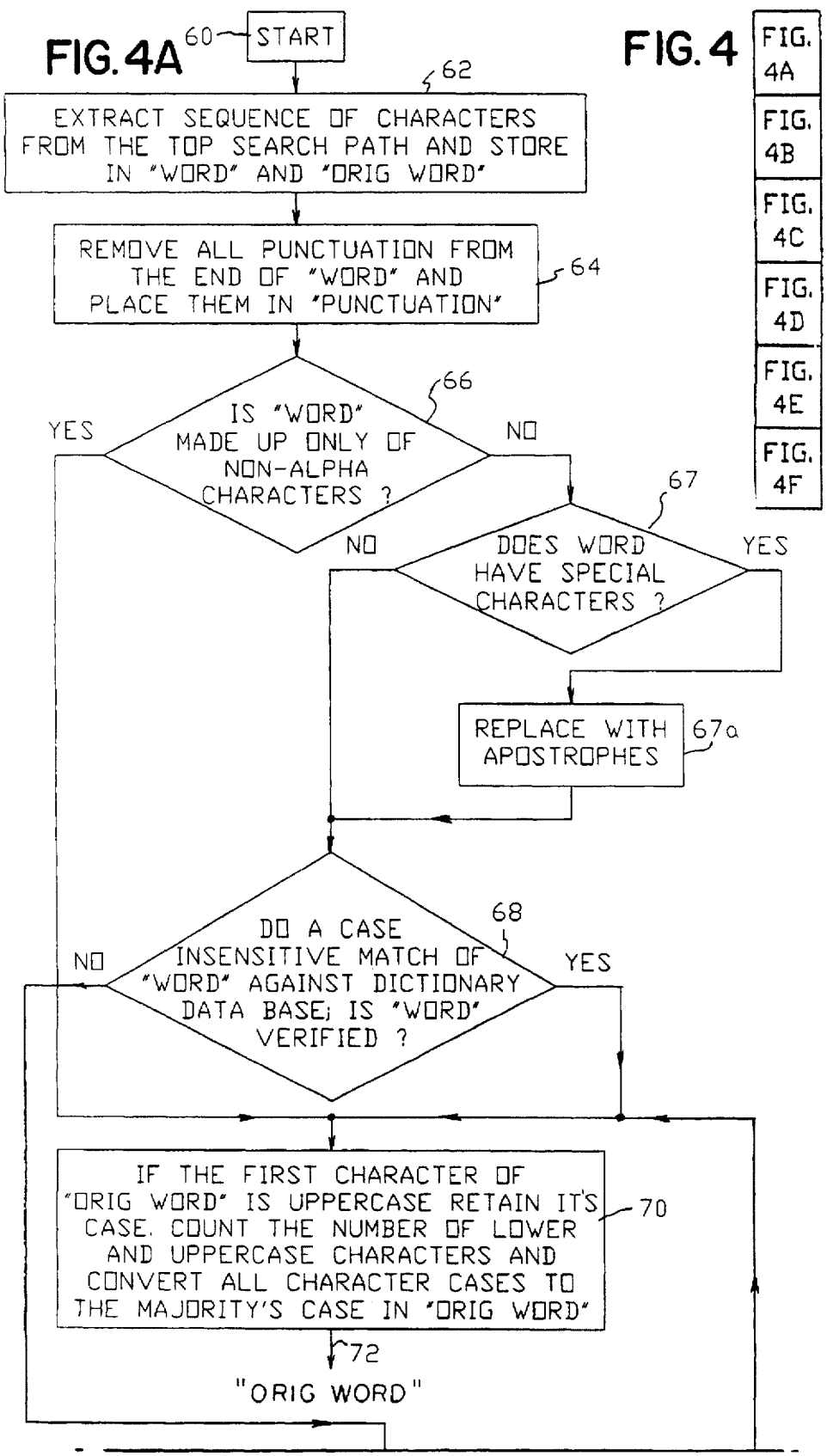

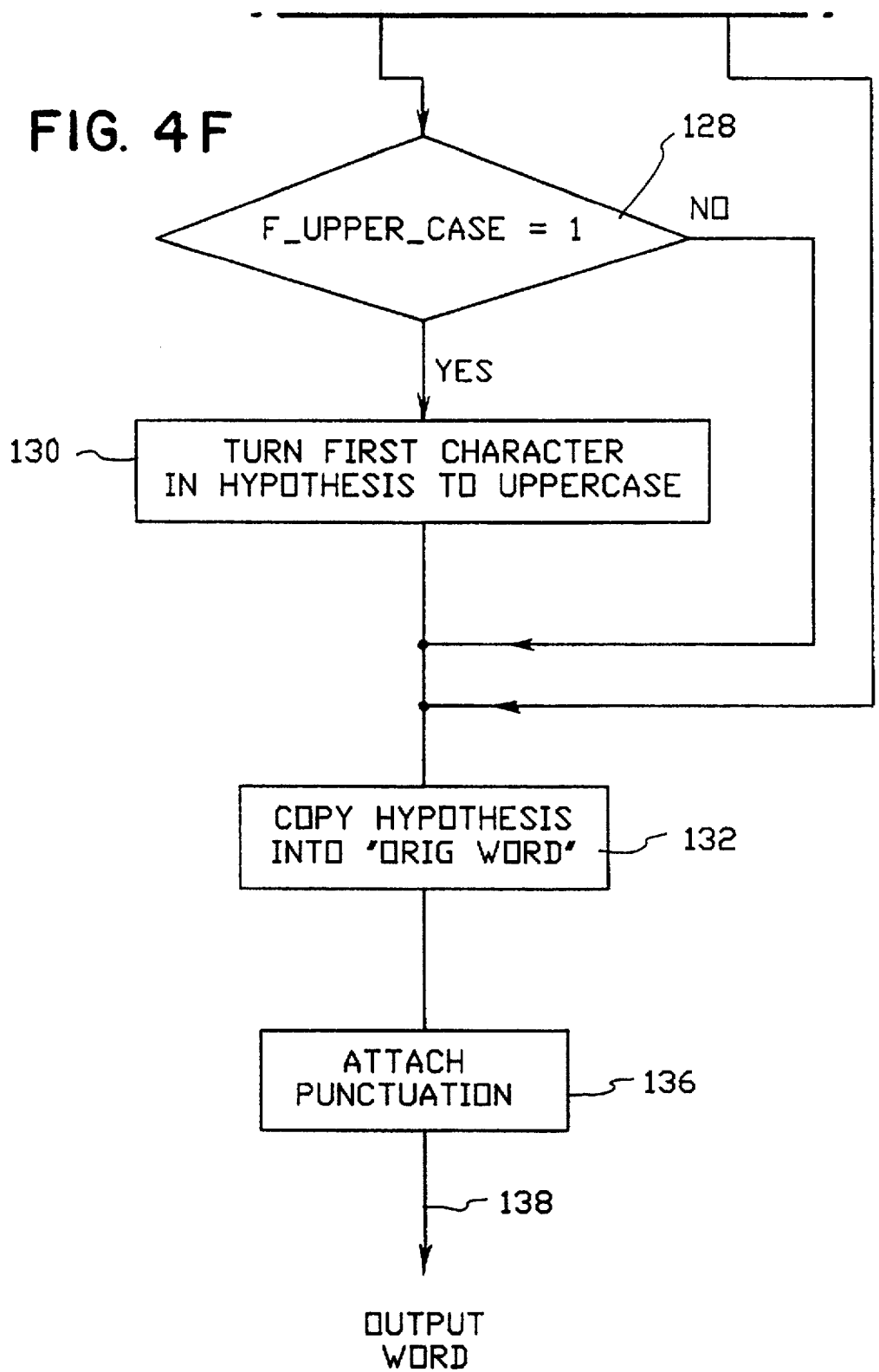

5,787,197

POST-PROCESSING ERROR CORRECTION SCHEME USING A DICTIONARY FOR ON-LINE HANDWRITING RECOGNITION

DESCRIPTION

This is a continuation-in-part of U.S. application Ser. No. 07/865,550 filed Apr. 9, 1992, now abandoned.

FIELD OF THE INVENTION

The invention is in the field of handwriting recognition, and is directed to post-processing error correction. In particular, the error correction is accomplished using a dictionary.

BACKGROUND OF THE INVENTION

Because of similar shapes, characters such as "v" and "u"; "k" and "h"; "l", "1", and "I"; and so on, any on-line recognition of handwriting characters cannot avoid producing errors. According to the present invention, these errors and errors caused by other sources are corrected utilizing a dictionary-driven error correction post-processing technique for handwriting recognition.

Various techniques have been utilized in character recognition systems, and the like, which include dictionaries, but none have been found utilizing the techniques found in this invention.

U.S. Pat. No. 4,653,107 to Shojima et al discloses a system in which coordinates of a "handwritten" pattern drawn on a tablet are sequentially sampled by a pattern "recognition" unit to prepare pattern coordinate data. Based on an area encircled by segments created by the sampled pattern coordinate data of one stroke and a line connecting a start point and an end point of the one-stroke coordinate data, the sampled pattern coordinate data of the one stroke is converted to a straight line and/or curved line segments. The converted segments are quantized and normalized. The segments of the normalized input pattern are rearranged so that the input pattern is drawn in a predetermined sequence. Differences between direction angles for the rearranged segments are calculated. Those differences are compared with differences of the direction angles of the "dictionary" patterns read from a memory to calculate a difference therebetween. The matching of the input pattern and the "dictionary" pattern is determined in accordance with the difference. If the matching fails, the first or last inputted segment of the input pattern is deleted or the sampled pattern coordinate data of the next stroke is added, to continue the "recognition" process.

U.S. Pat. No. 5,034,991 to Hagimae et al discloses a character "recognition" method and system in which a character indicated in a printed, stamped, carved or other form is two-dimensionally imaged and stored as image data and the stored image data is subjected to image processing to "recognize" the character. The "recognition" of the character is preformed in such a manner that each time the comparison of plural kinds of feature vectors extracted from the character to be "recognized" and a "dictionary" vector of each candidate character in a group of candidate characters preliminarily prepared is made for one of the plural kinds of feature vectors, a candidate character having its "dictionary" vector away from the extracted feature vector by a distance not smaller than a predetermined value is excluded from the candidate character group. The "dictionary" vector for each candidate character is defined as an average vector for a variety of fonts: A difference between the "dictionary" vector and the feature vector extracted from the character to be "recognized" is estimated by virtue of a deviation vector for the variety of fonts to produce an estimated value. The exclusion from the candidate character group is judged on the basis of the estimated values each of which is cumulatively produced each time the estimation for the difference is made.

U.S. Pat. No. 5,020,117 to Ooi et al discloses a system in which "recognition" character candidates and their similarities for each character obtained by a character "recognition" section from an input character string are stored in a first "recognition" result memory, and "recognition" character candidates obtained by rotating the corresponding characters through 180 degrees and their similarities are stored in a second "recognition" result memory. Address pointers for accessing the first and second "recognition" result memories are stored in an address pointer memory. The first "recognition" result memory is accessed in accordance with the address pointers read out from the address pointer memory in an ascending order, and the second "recognition" result memory is accessed in accordance with the address pointers read out from the address pointer memory in a descending order. Coincidences between "recognition" candidates read out from the first and second "recognition" result memories and character strings of "dictionary" words read out from a "dictionary" memory are computed by a coincidence computing section. A "recognition" result of the input character string is obtained based on the coincidence.

U.S. Pat. No. 5,010,579 to Yoshida et al discloses a hand-written, on-line character "recognition" apparatus, and the method employed by it, in which the structure of a "dictionary" for "recognition" is formed as a sub-routine type, whereby the "dictionary" can be made small in size and a time necessary for "recognition" can be reduced.

In commonly assigned U.S. Pat. No. 5,029,223, Jul. 2, 1991, Fujisaki discloses a method and apparatus for identifying a valid symbol or a string of valid symbols from a sequence of handwritten strokes. A method includes the steps of (a) generating in response to one or more handwritten strokes a plurality of stroke labels each having an associated score; (b) processing the plurality of stroke labels in accordance with a beam search-like technique to identify those stroke labels indicative of a valid symbol or portion of a valid symbol; and (c) associating together identified stroke labels to determine an identity of a valid symbol or a string of valid symbols therefrom. An aspect of the invention is that each of the constraint validation filters is switchably coupled into a serial filter chain. The switches function to either couple a filter input to a stroke label or decouple the input and provide a path around the filter block. An application writer has available a plurality of constraint filters. The application writer specifies which one or ones of the constraint filters are to be applied for a specific sequence of strokes. Fujisaki is incorporated herein by reference.

As stated above, the present invention utilizes a dictionary for post-processing error correction in an on-line handwriting recognition. The just discussed patents do not teach or suggest the use of a dictionary for such a purpose.

BRIEF DESCRIPTION OF THE DRAWINGS

FIG. 2 is a general block diagram of the dictionary post-processor of FIG. 1;

FIG. 3 is a composite depiction of FIGS. 3A and 3B;

FIGS. 3A and 3B, when taken together as shown in FIG. 3, comprise a general flow chart of the dictionary post-processor of FIG. 2;

FIG. 4 is a composite depiction of FIGS. 4A–4F;

FIGS. 4A–4F, when taken together as shown in FIG. 4, comprise a detailed flow chart of the dictionary post-processor of FIG. 3;

DISCLOSURE OF THE INVENTION

A dictionary based post-processing technique is disclosed for an on-line handwriting recognition system. An input string has all punctuation removed, and the string is checked against a word processing dictionary. If it matches against any word in the dictionary, the string is verified as a valid word. If it does not verify, a ranked list generated from cache and a spell-aid dictionary are used to construct a list of possible words represented by the input string. In some cases, the list is appended with possible words based on changing the first character of the top answer. A string and shape match score, a substitution score and a word length score are assigned to the items on the list. A word hypothesis is constructed from the list with each such word being assigned a score. The word with the best score is chosen as the output word for the processor. If the string that was hypothesized by the recognition system has good shape matching scores, it is returned as the result, even though it is not necessarily a word in the dictionary.

BEST MODE OF CARRYING OUT THE INVENTION

Figure 1:
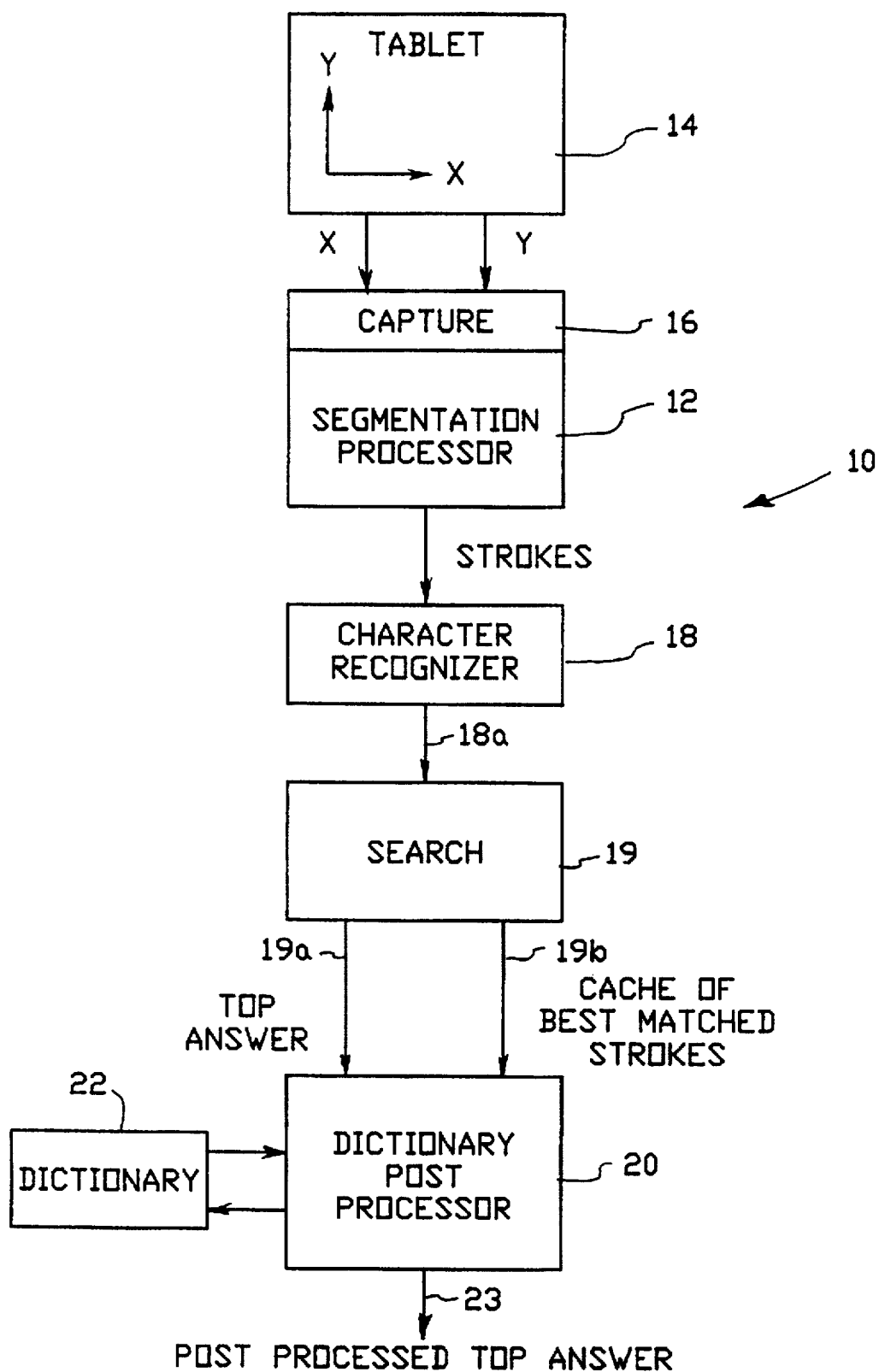
FIG. 1 is a block diagram of a dictionary based post-processor for an on-line handwriting recognition system in accordance with the present invention.

Referring to FIG. 1 there is shown in block diagram form a character recognition system 10 in accordance with the invention that includes a segmentation processor 12 coupled between an electronic tablet 14 and a character recognizer 18. Tablet 14 can be any of a number of suitable commercially available electronic tablets. The tablet 14 has an associated stylus or pen 15 with which, in a pen-down position, a user forms a string of symbols, such as block printing or script alphanumeric characters, on a surface of the tablet 14. The tablet 14 has x-axis and y-axis output signals expressive of the position of the pen 15 on an x-y tablet coordinate system. A stroke capture means 16 may be a software task which intercepts the x-y outputs from the tablet to generate x-y position pair data for the segmentation processor 12. In segmentation processor 18, the writing is segmented into basic units, called "segments" (also referred to as strokes) and each segment is classified and labeled. The character recognizer 18 operates to determine an identity of a connected group of segments based upon the probability of the segments representing particular symbols. Character recognizer 18, therefore, has an output 18a expressive of identified symbols such as alphanumeric characters.

In this regard it should be realized that the invention is applicable to the recognition of a number of hand-drawn symbols wherein a given symbol is composed of at least one segment. By employing the teaching of the invention, the system 10 readily recognizes symbols associated with various languages and also mathematical and other types of symbols.

The output of character recognizer 18 on line 18a is provided to search block 19 which determines a top answer on line 19a, i.e., a string of characters having the highest recognition score from block 18, and a cache of all best matched segments (based on their recognition scores from block 18) on line 19b. This cache includes ranked lists, one for each segment of the input word, said lists identifying the segment stored in memory which make the best match with a particular input segment. The best answer on line 19a and the cache of all best matched segments on line 19b, are related in that the top answer is the string from the cache having the highest cumulative score. Thus the top answer is a result of a search of the cache of best matched strokes which results in the best candidate for a recognized word, and the cache of best matched strokes contains a ranked array of most likely matches for the strokes in the array. A more detailed description of blocks 14–19 can be found in Fujisaki, U.S. Pat. No. 5,029,223, which has been incorporated herein by reference.

Dictionary post-processing is then performed in post-processing block 20, which uses the top answer word on line 19a, the cache of best matched strokes on line 19b, and a dictionary 22 to produce an output word on line 23.

Refer now to FIG. 2 which is a block diagram of the dictionary post-processor 20 of FIG. 1. A punctuation filter 24 receives the top answer on line 19a and the cache of best matched strokes on line 19b and removes all punctuation from the top answer. At a verification block 26, the recognized sequence forming the top answer is matched against a word processor dictionary in block 28 to see if any word exists with the exact spelling of the top answer. This matching is case insensitive. If there is a match, the top answer is provided to the unify case block 30 and a corresponding output word is provided on line 31. If, on the other hand, there is no verification, a sum of shape match scores of the string (SMSS) for the top answer is computed at block 32. The SMSS for the top answer represents the sum of the match scores for each character in the top answer. If the score for each character is at a predetermined level, which is determined empirically, the word is output to block 30, and a corresponding output word is provided, despite the absence of a match in the dictionary 28. Otherwise, at block 34 a stroke match is computed using the cache of best matched strokes. The block 34 generates a ranked list of all possible valid words from the strokes in the cache and to calculate the shape match score of each of these words. The shape match score for a string, or word is defined as the sum of scores of the strokes in the word. A word is "valid" if it is found in word processor dictionary 28. Call these valid words "end word hypotheses". The end word hypotheses with the best shape match scores are inserted into a "global word hypothesis list". The top answer is also placed in the global word hypothesis list. The global word hypothesis list is then provided to a spell-aid block 36 which takes the top answer and tries to find a close match in the dictionary 28. Block 34 is described in further detail below with respect to FIG. 5. A list of dictionary words most closely matching the top answer is inserted into the global word hypothesis list.

The model's output is very dependent on the initial character of the input string. Therefore, in most cases, the first character is retained. But, according to the invention, if the match score of the first character is worse than all other characters in the word, then it is replaced in block 38 in a manner described in more detail below.

At block 40, three types of scores, to be described later, are assigned to the words in the global hypothesis list, and at block 42, the best hypothesis in the global word hypothesis list is determined. At block 44, this best hypothesis is used as the final word, and punctuation is reinserted at block 46 with an output word being provided on line 48.

Figure 3B:
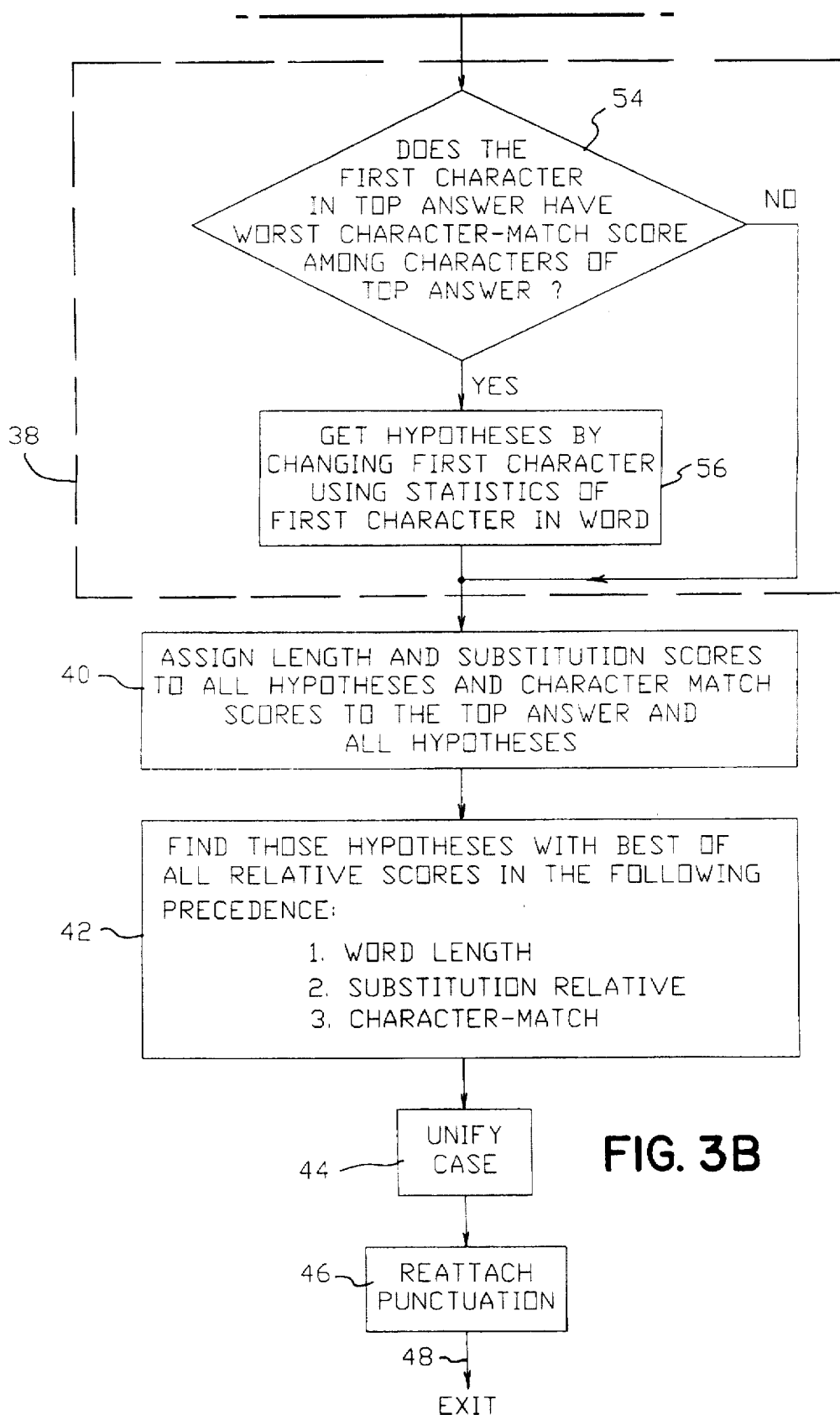

Refer now to FIGS. 3A and 3B which constitute a flow chart of the dictionary post-processor 20. In FIG. 3A, the top answer is provided on input line 19a of block 24 and the cache of best matched strokes signal is provided on line 19b of block 24, and the punctuation is removed from the top answer. Top answer is copied into a memory location labeled as "original word". At decision block 26, a determination is made whether the top answer corresponds to a word in the dictionary. If so, the top answer is provided to the unify case block 30 and a corresponding output word is provided on line 31. If, on the other hand, no match for the top answer exists in the dictionary 28, proceed to shape match score of string block 32, which comprises blocks 50 and 52. At decision block 50, the shape match score for each character in top answer is compared and at block 52, the shape match scores for each character in the top answer are examined and a determination is made whether or not the worst character score in the top answer is better than a predetermined threshold. If so, proceed to block 30 to unify the case and provide an output word on line 31. If not, proceed to block 34. In block 34, a stroke match is made using the cache of best matched strokes to find all combinations of strokes in the cache which will verify, i.e., which can be found in dictionary 28. The words found in the dictionary are ranked by stroke match score and stored along with their stroke match scores, in an array called the global word hypothesis list.

At spell-aid block 36, a standard word processor dictionary is used to obtain additional suggested words based on the top answer.

Proceed next to first character replacement block 38 in FIG. 3B which comprises blocks 54 and 56. In decision block 54, determine whether or not the first character in the top answer has the worst shape match score among all the characters in the top answer. If so, proceed to block 56 and get a hypothesis character by changing the first character using statistics of first characters in words. The statistics are simply the likelihood of each character in the English alphabet beginning an English word. Of course, this concept can be extended to other languages as well. The ranked list of initial characters is used to replace the first character in the top answer. As each new first character is added, the modified top answer is compared with words in dictionary 28. If first character replacement produces any matches, the matches are added to the global word hypothesis list. In this event, the replacement initial character is assigned its value from the cache of best matched strokes, if it appears there, and is assigned the worst possible score if it doesn't. If the first character in the top answer is not the worst character, block 56 is skipped.

Proceed then to block 40 and assign a character shape-match score (or "character match score") to the top answer and assign character shape match scores, substitution scores and word length scores to all hypotheses. These scores are described in more detail below.

In block 42, find the hypothesis with the best of all relative scores based on the following precedence: 1. word length score 2. substitution score 3. relative shape-match. After this determination, proceed to block 44 and unify the case of the best hypothesized word, and then to block 46, where punctuation is reinserted, and an output word is provided on line 48.

Refer now to FIGS. 4A–4F, which set forth an even more detailed flow chart of the operation of the post-processor block 20. The flow chart starts at block 60 of FIG. 4A, and at block 62 a sequence of characters having the highest cumulative shape match score is extracted from the cache of best matched strokes. The steps of blocks 60 and 62 are conducted in block 19 of FIG. 1. This sequence is the top answer stored in locations "top answer", "word" and "original word". The modifications to top answer which have been referred to above in actuality are performed on copies of top answer stored in original word and/or word. At block 64, all punctuation is removed from "word" and the punctuation is stored for later use. At block 66, if "word" is made up only of non-alphabetic characters, then it is verified as a valid string. At block 67, if "word" has any special characters, they are changed to apostrophes in block 67a, and "word" is verified as a valid string. The apostrophes are placed in the string instead of some other nonalphabetic character because apostrophes are recognized as valid characters by the dictionary, although of a low probability. Because they are of a low probability, they will likely be replaced by the dictionary. At decision blocks 68, it is determined whether "word" is verified as a valid word in dictionary 28. This determination is case insensitive. If "word" is verified as valid, proceed to block 70 and if the first character of the "original word" is upper case, retain its case. Count the number of lower and upper case characters and convert all character cases in "word" to the majority case of the "original word". The "original word" is then provided as an output word on line 72.

Figure 4B:
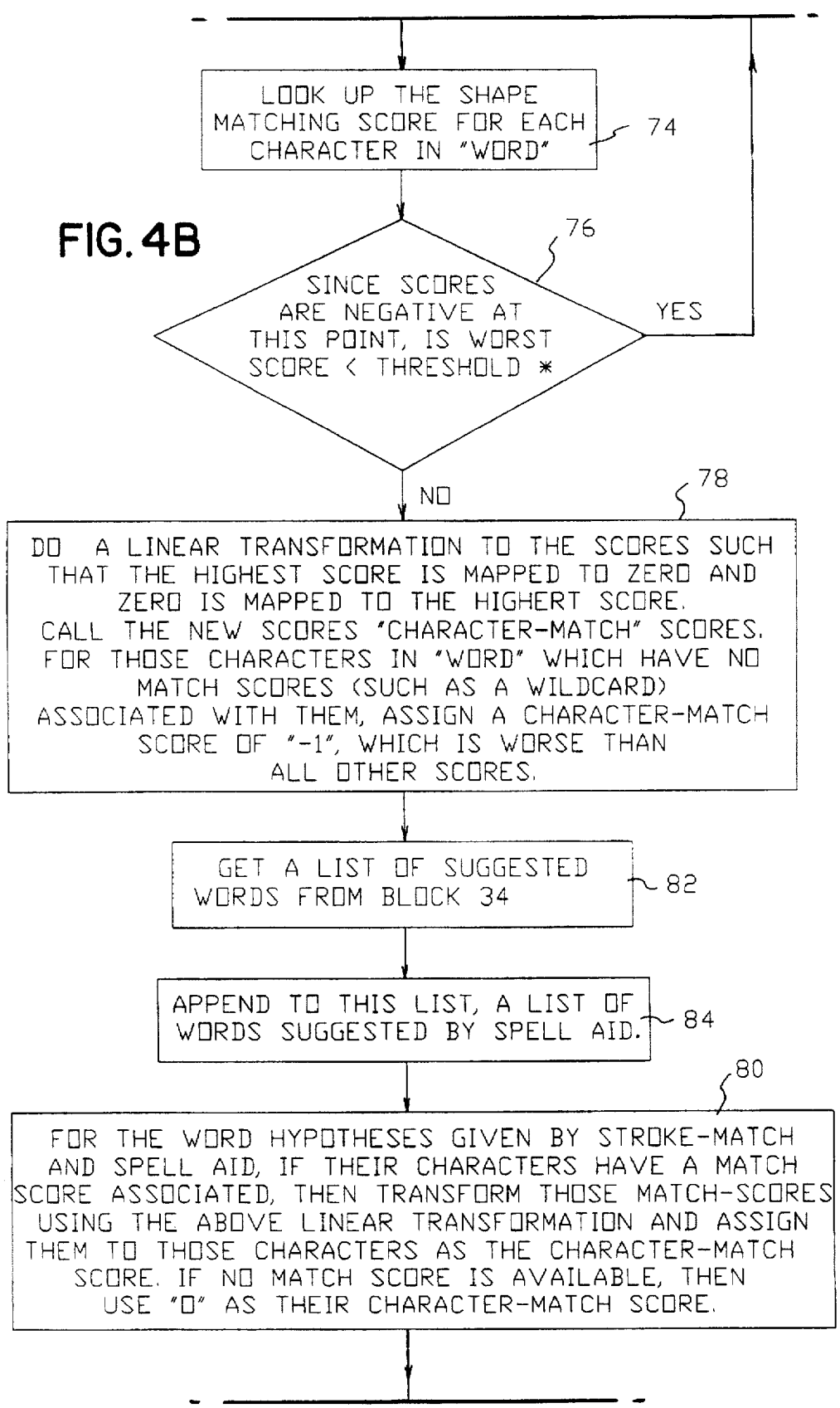

If in decision block 68 "word" is not verified as a valid word in the dictionary, proceed to block 74 of FIG. 4B where the shape match score for each character in "word" is looked up. At this point, the shape match scores for characters can have a maximum value of zero, and a minimum value of any negative number. At decision block 76, it is determined whether the shape match score for each character is less than a threshold. If so, return to block 70 (FIG. 4A) and generate an output word on line 72. If the determination is that the worst character shape score is not less than the threshold, proceed to block 78 where a linear transformation of the shape matching scores is performed such that the highest score is mapped to zero and zero is mapped to the highest score. That is, the linear equation $y(x)=\lambda x+\beta$ is solved for each character shape score, where x is the score before transformation, y(x) is the new mapped value of x. $\lambda$ and $\beta$ are constants. To solve for $\lambda$ and $\beta$, let y(0)=|worst match score|, and y(worst match score)=0. Then solve for each remaining x. In essence, this mapping converts the negative shape scores to positive values, while maintaining the same ranking. Call the new scores "character-match" scores. For those characters in "word" which have no shape match scores associated with them, (such as when the character is so poorly written that no match can be found, and is therefore assigned a wild card) assign a character-match score of "−1" which is worse than all other scores. At block 82, get a list of suggested words from block 34, and proceed to block 84 and append to this list a list of words suggested by the spell-aid. These steps are explained above with respect to FIG. 3A, blocks 34 and 36. At block 80, for the word hypotheses given by stroke-match and spell-aid, if their characters have associated shape match scores, then transform those match-scores using the above linear transformation and assign these scores to those characters as character-match scores. If no shape match score is available, that is, if a character is returned by spell aid which does not appear as one of the characters formed by the strokes in cache, and thus would not have a score, then use "0" as its character-match score.

Figure 4C:
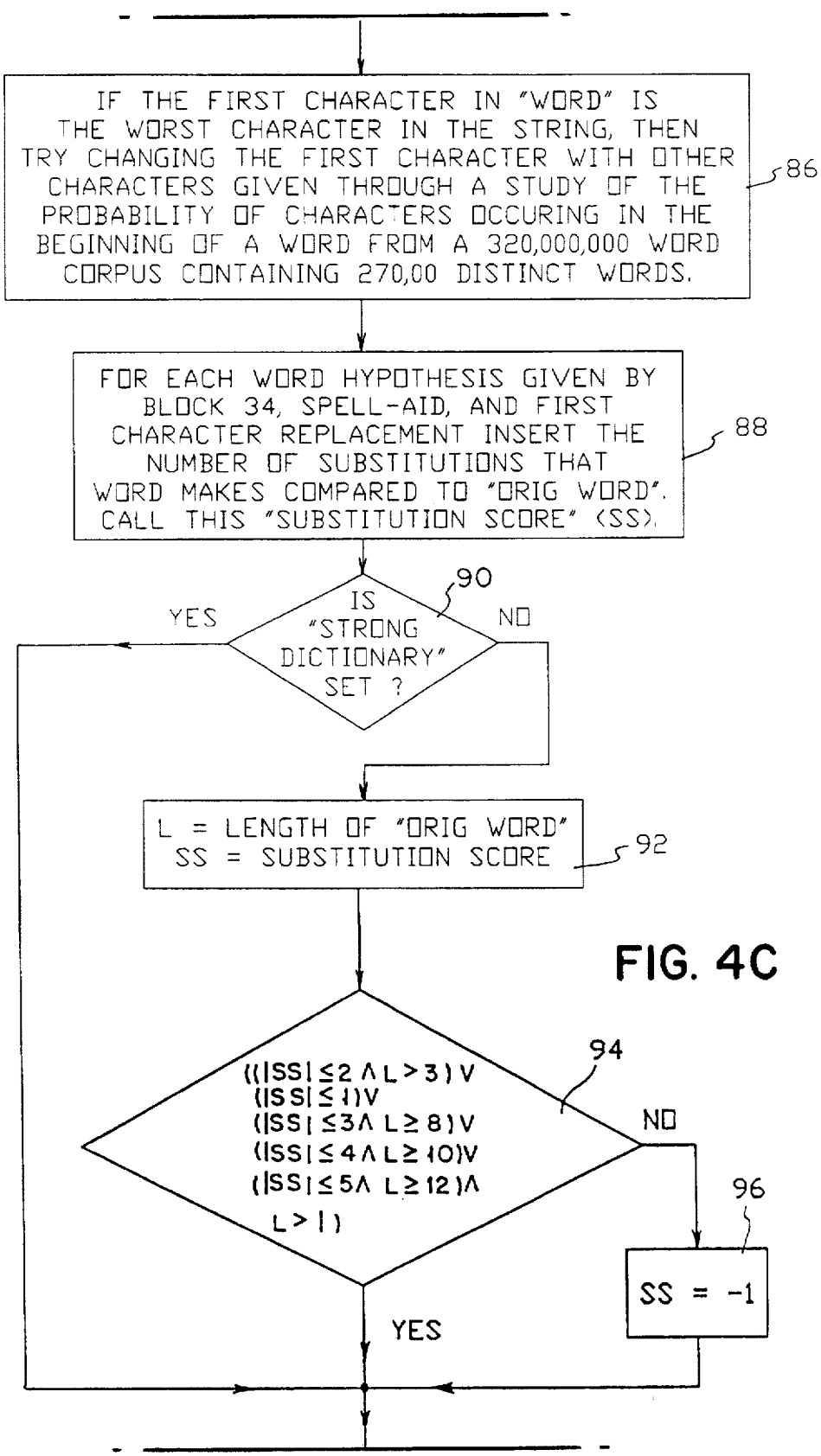
Figure 4D:
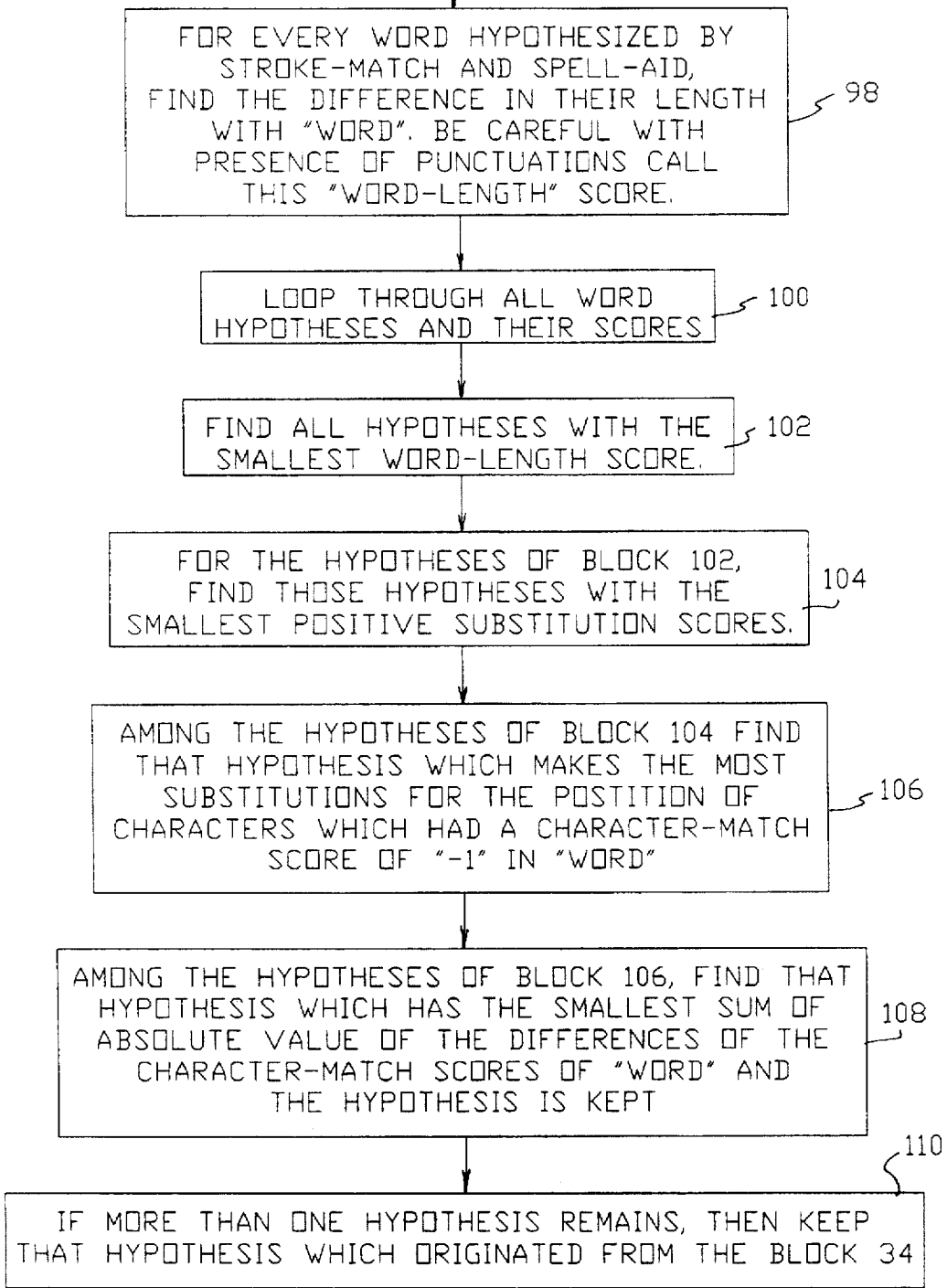

At block 86 of FIG. 4C, if the first character in "word" has the lowest score in the string, then try changing the first character with other characters given through a study of the probability of characters occurring at the beginning of a word from a predetermined word corpus, for example, 320,000,000 containing a predetermined number of distinct words, for example, of 270,000 such words.

At block 88 (corresponding to block 40 of FIG. 2.), the first of three scores is computed (as referred to above with respect to FIG. 3B, block 42). For each word hypothesis given by stroke-match and spell-aid, calculate and store in association with each such word hypothesis the number of substitutions required to transform the word hypothesis into "original word." Call this the "substitution score" (SS). Proceed then to decision block 90 for the determination of whether or not this is a strong dictionary. Whether the dictionary is "strong" is a user settable option. A strong dictionary will return hypotheses only of the same length as the word being checked. If not a strong dictionary, proceed to block 92 of FIG. 4C where L is defined as the length of the "original word" and SS equals the substitution score. At decision block 94, a test is made to keep the error correction robust. Robustness in this context means that if an excessive number of substitutions (in relation to word length) must be made to the original word to obtain a particular word in the dictionary, then that dictionary word will be eliminated from consideration. This allows words not in the dictionary, but correctly recognized, to have a higher chance of being chosen as the output word than a dictionary word requiring excessive substitution.

If not robust, proceed to block 96 and set SS equal to −1, which effectively eliminates the dictionary word from consideration. Then proceed to block 98 of FIG. 4D to determine for every word hypothesized in block 34 and spell-aid (block 36) the difference in their length L with "word". That is, determine how much the number of characters in each hypothesized word differs from the number of characters in "word". This same path is taken if there is a strong dictionary decision at block 90. Punctuation is ignored in determining length. The difference between L and the length of "word" is the "word-length" score. At block 100, each word hypothesis and its score is considered.

With the following steps, the global list of hypotheses is narrowed using the three calculated scores. At block 102 find all hypotheses with the smallest word-length score. As stated above, the word length score is the difference between the number of characters in "word" and each hypothesis. At block 104, for the hypotheses with the smallest word length scores, find those hypotheses with the smallest substitution scores. Proceed to block 106 of FIG. 4D and among these word hypotheses having the smallest word length score and the smallest substitution score, find the hypotheses which make the most substitutions for the positions of characters which had a character match score of "−1" in "word". (If an unrecognizable character is replaced, this has higher probability of being a correct replacement than would the replacement of a character with a high score.) At block 108 find the hypothesis among the remaining hypotheses which has the smallest sum of absolute values of the differences of the character-shape match scores of "word" and the hypothesis. In block 110, if the remaining list of hypotheses has more than one hypothesis, then keep that hypotheses which originated from the stroke match module, i.e., the top answer.

Figure 4E:
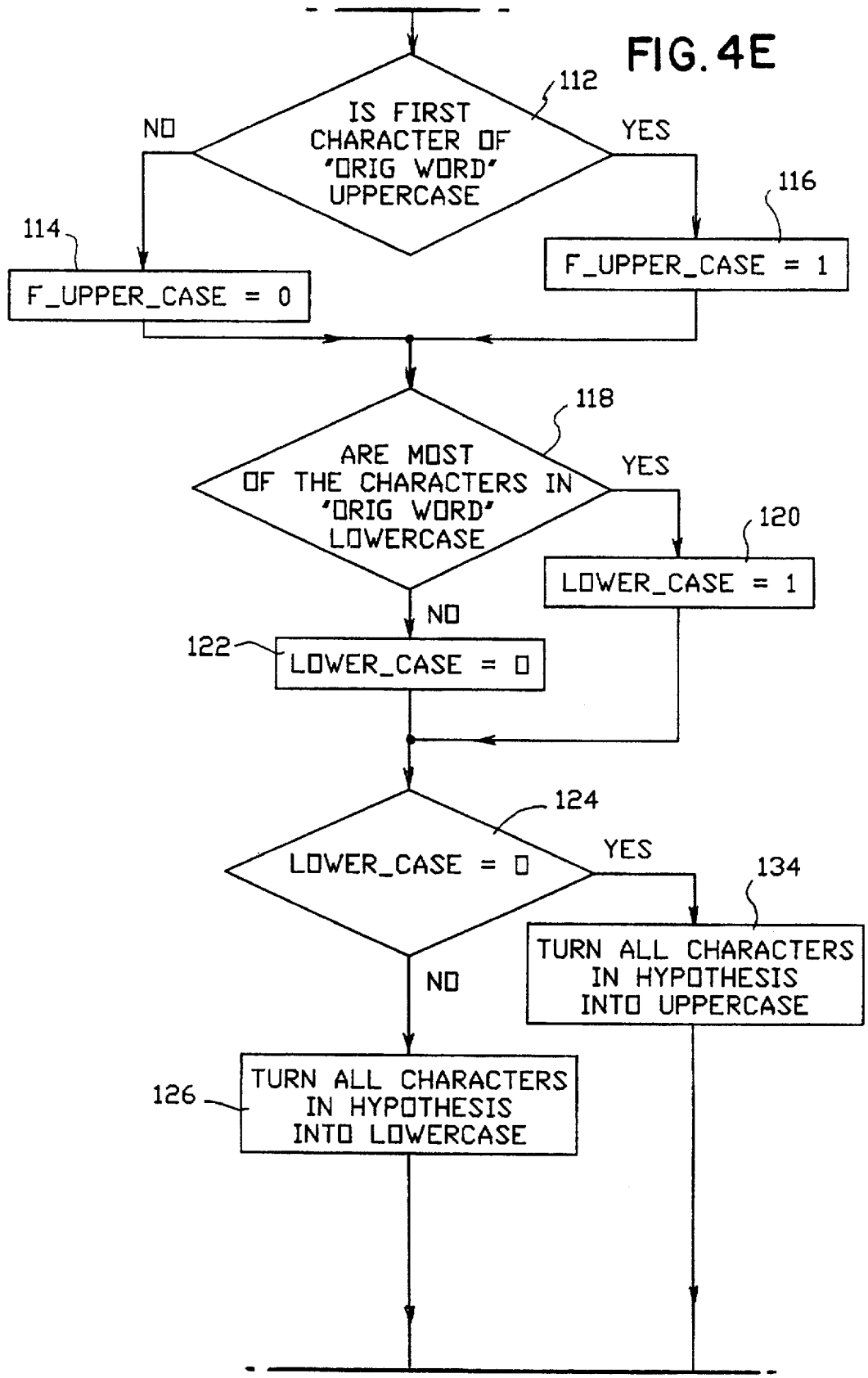

FIG. 4E shows a detailed description of the unify case block 44. At decision block 112, it is determined whether the first character of the "original word" is upper case. If not, go to block 114 and set the upper case equal to zero, and proceed to block 118. If it is, proceed to block 116 and set the upper case equal to one. Proceed then to decision block 118 where it is determined whether or not most of the characters in the "original word" are lower case. If so, proceed to block 120 and set the lower case equal to one and then proceed to block 124. If in decision block 118 most of the characters in the original word are not lower case proceed to block 122 and set lower case equal to zero. At decision block 124, a determination is made if the lower case equals zero. If not, proceed to block 126 and turn all characters in the hypotheses into lower case. If lower case equals to zero in decision block 124, proceed to block 134 and turn all characters in the hypotheses into upper case, and then proceed to block 132 at FIG. 4F. At block 128 of FIG. 4F, a determination is made if the upper case equals one, if not, proceed to block 132.

If so, proceed to block 130 and turn the first character in the hypothesis into upper case. Proceed then to block 132 and copy the hypotheses into the original word. At block 136 punctuation is reinserted in the word and an output work is provided on lien 138.

Figure 5:
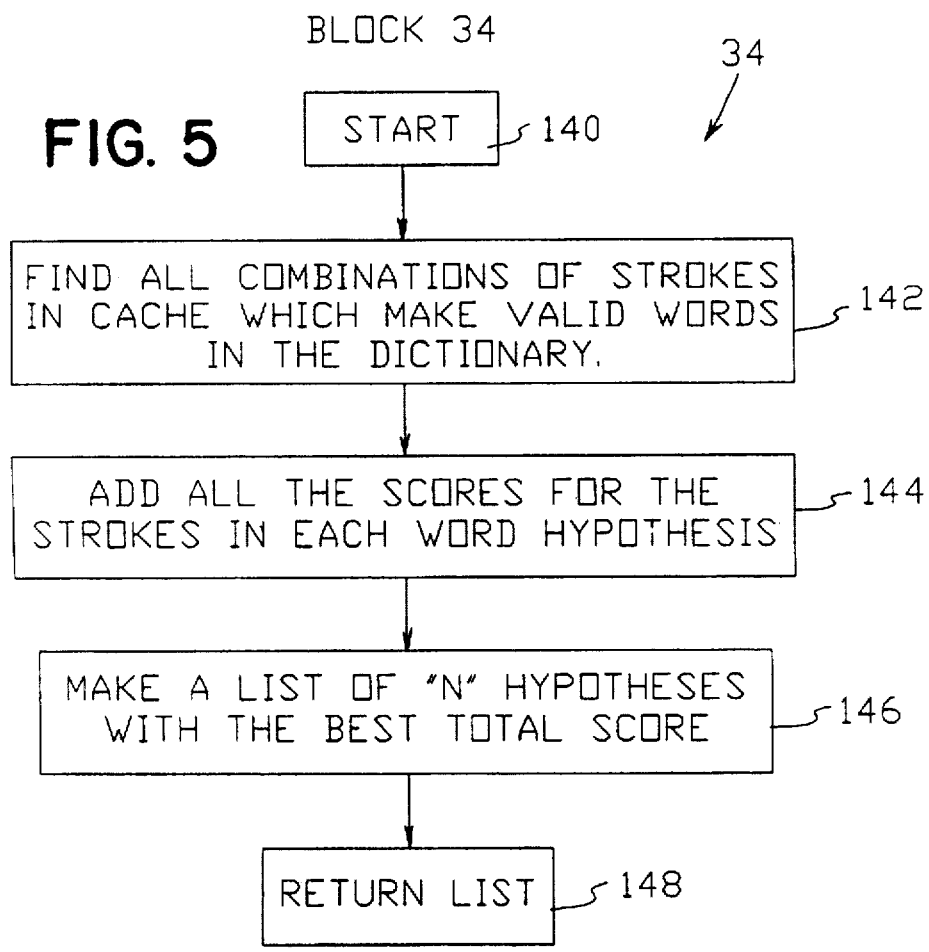
FIG. 5 is a flow chart of the ranked list of valid words in cache block 34 of FIGS. 2 and 3.

Refer now to FIG. 5 which is a detailed flow chart of the stroke match block 34 shown in FIGS. 2 and 3. The flow chart begins at 140. At block 142, the top score stroke hypothesis is taken from the stroke matcher and all combinations of strokes are found which make valid words in the dictionary. At block 144 all these scores for the strokes in each word hypotheses are added. At block 146 a list of "N" hypotheses with the best total score is made and a return list is made at block 148.

Figure 6:
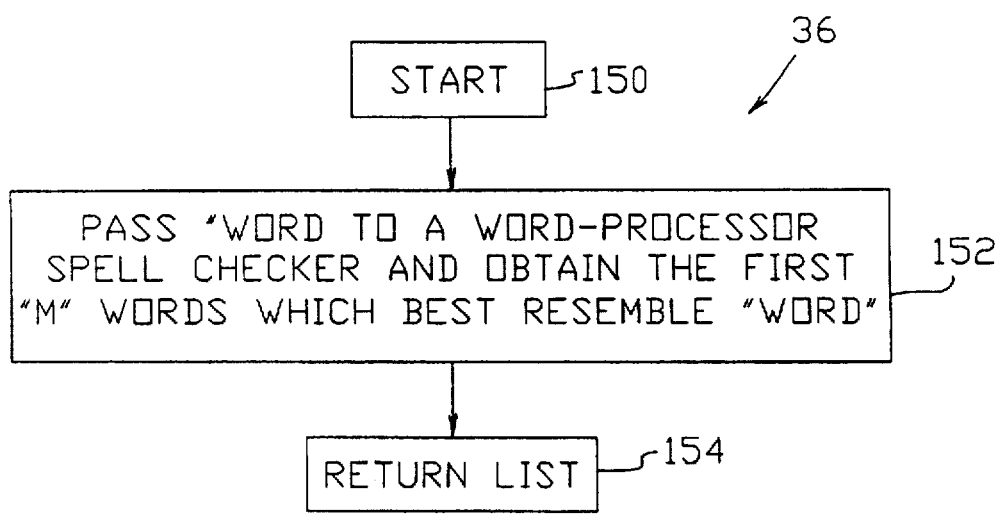
FIG. 6 is a flow chart of the spell-aid block 36 of FIGS. 2 and 3.

Refer now to FIG. 6 which is a detailed flow chart of the spell-aid block 36 of FIGS. 2 and 3. The flow chart is started at block 150, and at block 152, the "word" is passed to work processor spell checker to obtain the first six words which most resemble the "word" and these are returned to the list at block 154.

Having thus described our invention what we claim as new and desire to secure as Letters Patent, is:

1. A method of using a dictionary for on-line handwriting recognition, said method comprising the steps of:

inputting a handwritten word to be recognized;

providing a top answer word for recognition, where said top answer word is made up of a sequence of at least one character which is made up of a sequence of at least one segment;

providing a cache of ranked strokes derived from recognition of the handwritten word;

determining if the sequence of characters in the top answer word matches a word in the dictionary with the same spelling, and if so, providing the top answer word as an output word; and if not calculating a shape match score for the characters of the top answer word;

determining if the shape match score for the worst character in the top answer word is better than a predetermined threshold, and if so, providing the top answer word as an output word; and if not identifying a set of new candidate words from the dictionary, said set comprising words formed from all combinations of segments in the cache that produce recognizable characters;

calculating match scores for the new candidate words, each match score comprising the sum of shape match scores of characters in the new candidate words;

comparing the new match scores of the new candidate words and the top answer and providing the one having the best score as an output word.

* * * * *